United States Patent Office 3,418,889
Patented Dec. 31, 1968

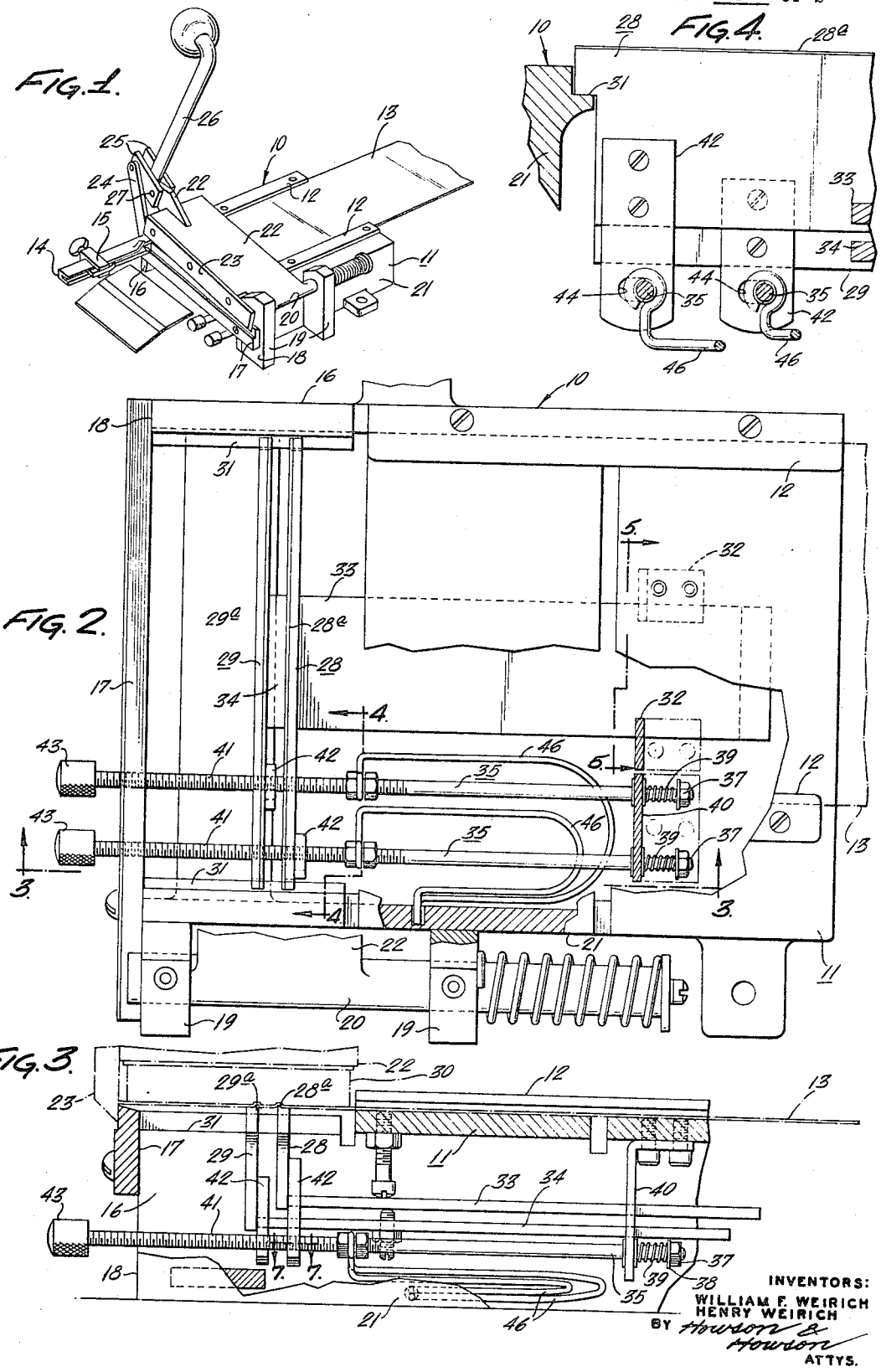

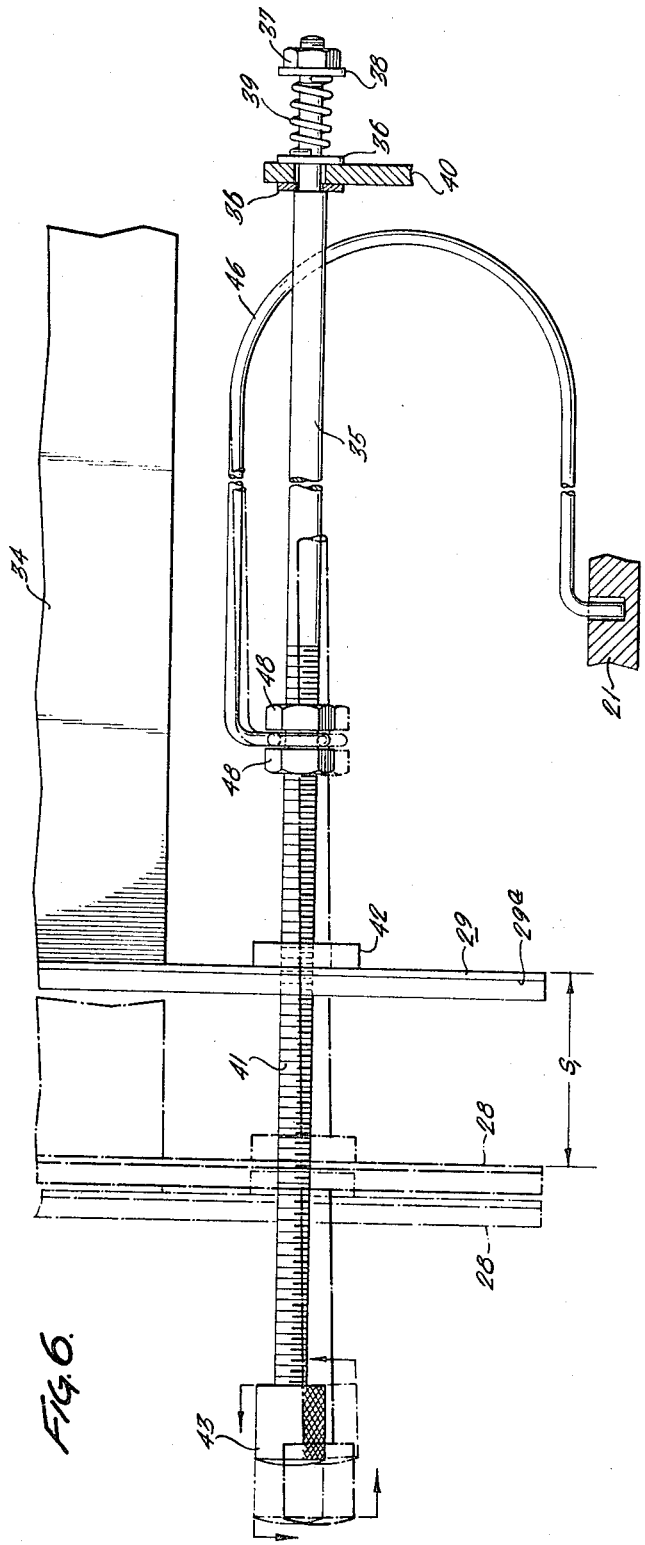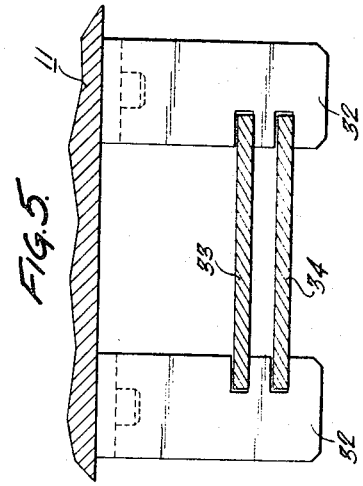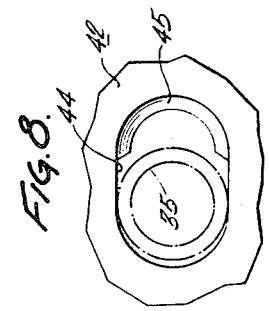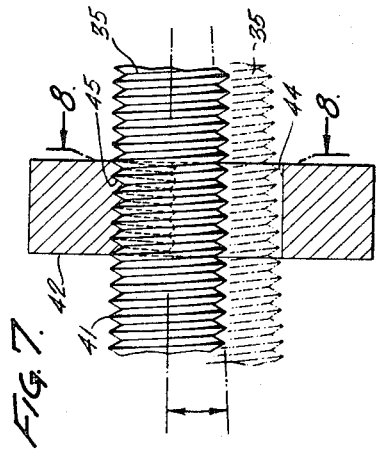

3,418,889
DEVICE FOR CREASING AND CUTTING SLOT INSULATION
William F. Weirich, 134 Henley Road, Philadelphia, Pa. 19151, and Henry Weirich, Lenni Road, Lenni, Pa. 19052
Filed Dec. 21, 1965, Ser. No. 515,317
2 Claims. (Cl. 93—1)

ABSTRACT OF THE DISCLOSURE

The present disclosure relates to improvements in a device for cutting and forming insulation, which insulation is to be used, for example in the winding slots of electrical machines such as electric motors or the like. As formed by the device, the insulation is easily cut to size while the adjacent portion, which is to be subsequently cut to size, is simultaneously creased so that it may be easily inserted in the winding slots of a machine. Disclosed are improvements in a machine for gauging and cutting slot insulation, which machine comprises means for supplying a sheet or strip of insulation under cooperable knife means, at least one of which knife means is movable to cut, in conjunction with its counterpart, a predetermined length of insulation from the sheet. In addition, crease means are provided to place at least one crease (preferably two) in the portion of the sheet which is to be subsqeuently cut into a predetermined length, the knives and crease means working together to perform a simultaneous creasing and cutting of the sheet. As the location of the creases is critical, both coarse and fine adjustment means are provided for displacing the crease means relative to the cooperable knife means.

State of the prior art

The machine to which the present invention is related and is an improvement on is clearly set forth in the Weirich et al. patents, Nos. 2,675,873 and 2,741,166. As illustrated in these patents very fine or vernier adjustment means are provided for locating the exact position of the crease or creases to be formed in the portion of the insulation to be cut. However, because of the necessity of changing the position of the crease or creases upon cutting and creasing differing lengths of insulation pieces to accommodate various winding widths, large changes in the location of the crease relative to the cutting knives must be effected by the fine adjustment means which may involve considerable time loss.

Description of the invention

In view of the above it is a principal object of the present invention to provide means to reduce the set-up time for effecting economies in cutting and forming insulating pieces.

Another object of the present invention is to provide boht coarse and fine adjustment means for facilitating the quick and accurate positioning of the crease means relative to the knife means.

Still another object of the present invention is to provide easily actuable and quick-acting clutch means in conjunction with the fine adjustment means to effect a rough or coarse positioning of the crease means relative to the knife means.

Other objects and a fuller understanding of the invention may be had by referring to the following description and claims taken in conjunction with the accompanying drawings in which:

FIG. 1 is a perspective view of apparatus embodying the present invention;

FIG. 2 is an enlarged fragmentary plan view of a portion of the apparatus illustrated in FIG. 1;

FIG. 3 is a fragmentary sectional view taken along line 3—3 of FIG. 2;

FIG. 4 is another fragmentary sectional view taken along line 4—4 of FIG. 2;

FIG. 5 is a fragmentary sectional view taken along line 5—5 of FIG. 2;

FIG. 6 is an enlarged view of a portion of the apparatus illustrated in FIGS. 1–4 with certain parts of the apparatus removed to clarify the operation of the apparatus of the present invention;

FIG. 7 is an enlarged fragmentary sectional view taken along line 7—7 of FIG. 3; and FIG. 8 is a fragmentary sectional view taken along line 8—8 of FIG. 7 and as if FIG. 7 were not in section.

Although the apparatus to which the present invention relates is more fully described in the Weirich patents, Nos. 2,675,873 and 2,741,166, a brief description of the apparatus is necessary to set forth the environment to which the present invention relates.

Referring now to the drawings, and especially FIG. 1 thereof, apparatus 10 for cutting and forming insulation pieces to be used, for example, in the winding slots of electrical machines such as electric motors, is illustrated therein. In the present instance, the apparatus 10 comprises a worktable 11 having a pair of transversely spaced guides 12 thereon, at least one of which is adjustable to compensate for differences in width of a sheet 13 of insulation material fed therein. As illustrated, an inwardly urged pivotably mounted guide extension 14, having a longitudinally adjustable sheet stop 15 mounted thereon, extends longitudinally from one side 16 of the table 11. As set forth in the aforementioned patents, the position of the stop 15 determines the length of the piece of the sheet to be cut off. As shown in FIGS. 1–3, one portion of cooperable knife means, in the present instance a stationary knife element 17, is secured to the forward end 18 of the table 11 and extends transversely thereto. A pair of longitudinally spaced bearing supports 19 mounting a main pivot 20 (see FIG. 2) are connected to the other side 21 of the table 11 and carrying a transversely extending arm 22 mounting the other cooperable knife means, in the present instance a shear element 23 positioned on the arm so as to cooperate with the stationary knife element 17. Actuator means, comprising a grace 24 mounted on the side wall 16 of the table 11 pivotably connects a pair of brackets 25 securely embracing a handle 26 and including a second pivot 27 connecting the transversely extending arm 22. Thus transverse movement of the handle 26 will cause angular rotation of the arm 22 about the pivot 20.

In order to permit creasing of the sheet 13 corresponding to, for example, the width of the windings intermediate the slots in an electric motor, crease means, in the present instance a pair of transversely extending crease elements 28 and 29 having upwardly projecting creasing edges 28a and 29a respectively are mounted adjacent the one end 18 of the table 11 to cooperate with the transversely extending arm 22 upon actuation thereof. As illustrated in FIG. 3 the lower portion of the transversely extending arm 22 is provided with a resilient pad 30 while the creasing edges 28a and 29a project above the guiding plane of the guides 12. As illustrated in FIGS. 2, 4, and 5, the creasing members are supported in the plane perpendicular to the guiding plane by crease guides 31 and are supported in the lateral plane for longitudinal movement thereof by a pair of bracket guides 32 depending from the upper surface of the table 11 and engageable with longitudinal extensions 33 and 34 connecting the creasing elements 28 and 29 respectively.

In accordance with the invention, coarse adjustment means are provided in conjunction with fine adjustment means so as to locate the crease elements 28 and 29 with respect to the cooperable knife elements 17 and 23. To this end, and as best illustrated in FIGS. 2, 3, 6, and 7, each of the creasing elements is provided with a longitudinally extending shaft 35 which passes through collars 36 mounted adjacent a depending bracket 40, and terminates in a rearwardly urging biasing means, in the present instance comprising a nut 37, washer 38 and a compression spring 39 intermediate the washer and the bracket 40. As illustrated, at least the forward portion of each shaft 35 is provided with a fine threaded portion 41, each shaft being normally cooperable in threaded engagement with a depending brace 42 to its associated creasing element. In this manner, a simple turning of a knob 43 extending exteriorly of the table 11 permits fine adjustment of the associated creasing element relative to the cooperable knife means and longitudinally of the table 11.

As it is preferable that the threaded portion 41 of each shaft 35 is of a fine pitch to permit precise adjustment of its associated creasing element upon rotation of the knob 43, a large adjustment of the creasing elements requires a considerable expenditure of time. In order to overcome the economic loss caused by this waste of time, the coarse adjustment means may be actuated to facilitate the rapid relocation of each element prior to making fine adjustments. To this end, each of the shafts is provided with quick-disconnect and connect clutch means which permit rapid longitudinal displacement of the elements. As illustrated in FIGS. 4, 6, 7, and 8, the clutch means comprises a slot 44 in the depending brace 42, in the present instance the slot extending laterally, and having a portion 45 which is threaded. In order to engage the clutch, or urge each shaft into engagement with the threaded portion 45 while the apparatus 10 is being used, biasing means, in the present instance comprising a bent spring rod 46, is loosely coupled to its respective shaft 35 and prevented from longitudinal movement by lock nuts or the like 48. As illustrated in FIG. 2, the rods may be conveniently anchored in the side wall 21 of the table 11.

In operation, if it is desired to move, for example, the creasing element 29 from a rearward position to a forward position a total distance of $S_1$ as illustrated in FIG. 6, the user may simply grasp the knob 43 and pull it forwardly (or longitudinally) until the spring 39 associated with the shaft 35 is fully compressed. Thereafter, as the slot 44 extends laterally, movement of the knob laterally will disengage the threaded portion 41 of the shaft 35 from the threaded portion 45 and permit the shaft to move longitudinally and rearwardly until the spring is fully decompressed. Releasing the knob 43 permits the bent spring rod 46 to cause reengaginment of the threaded portion 41 of the shaft 35 in the threaded portion 45 associated with the element 42. Alternatively, if it is desired to move a creasing element such as the element 29 rearwardly the reverse procedure may be followed, i.e. first the shaft 35 would be moved laterally to disengage the threads 45, then pulled out (or moved forwardly) to compress the spring 39, then moved laterally to engage the threaded portion 45. Thereafter decompression of the spring 39 permits rearward movement of the shaft and thus the element 29. In either case, large changes in the position of the creasing means may be effected by the coarse adjustment means while incremental or vernier adjustment may be effected by rotation of the knob 43.

Thus, the present invention provides both coarse and fine adjustment means including clutch means for permitting large incremental changes as well as fine changes in the positioning of the creasing elements. In addition, as the apparatus utilized to achieve this end is relatively simple, a reduction in the time for changing the set-up of the creasing elements is not only achieved but an over-all saving is effected due to the inexpensive structure.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. In apparatus for gauging and cutting slot insulation comprising a longitudinally extending table, means operating in conjunction with said table for supporting a sheet of insulation to be worked on, cooperable knife means and means to move at least one of said knife means into engagement with the other of said knife means to cut a predetermined length of insulation from said sheet, and crease means to place at least one crease in said portion to be cut, said crease means operable to crease said sheet of insulation upon said one knife means engaging said portion;

an improved adjustment means for displacing said crease means relative to said cooperable knife means comprising, a shaft mounted on said table extending longitudinally thereof, said shaft including a threaded portion, means connecting said threaded portion of said shaft to said crease means to effectuate longitudinal movement of said crease means upon rotation of said shaft, said connecting means including a threaded portion normally engaging the threaded portion of said shaft, and a non-threaded portion, whereby movement of said shaft into said non-threaded portion causes disengagement of said shaft from said connecting means thereby allowing longitudinal movement of said shaft without movement of said crease means, a bent spring rod connected between said shaft and said table to normally urge said threaded portion of said shaft into engagement with said threaded portion of said connecting means, said rod engaging the shaft in spaced relation to said connecting means and coupled to prevent relative longitudinal movement therebetween, bracket means mounted on said table to slidably retain said shaft, and biasing means cooperating with said bracket and said shaft to permit limited longitudinal movement of said shaft relative to said connecting means.

2. Apparatus according to claim 1 wherein said bent spring rod is in the form of a U having legs substantially parallel to said shaft.

References Cited

UNITED STATES PATENTS

| 490,603 | 1/1893 | Schmidt | 269—180 |
| 2,133,892 | 10/1938 | Gelinski | 269—180 |
| 2,741,166 | 4/1956 | Weirich | 93—1 |

FOREIGN PATENTS

| 6,765 | 3/1893 | Great Britain. |

WAYNE A. MORSE, Jr., *Primary Examiner.*

US. Cl. X.R.

93—58; 269—180